United States Patent Office 2,828,104
Patented Mar. 25, 1958

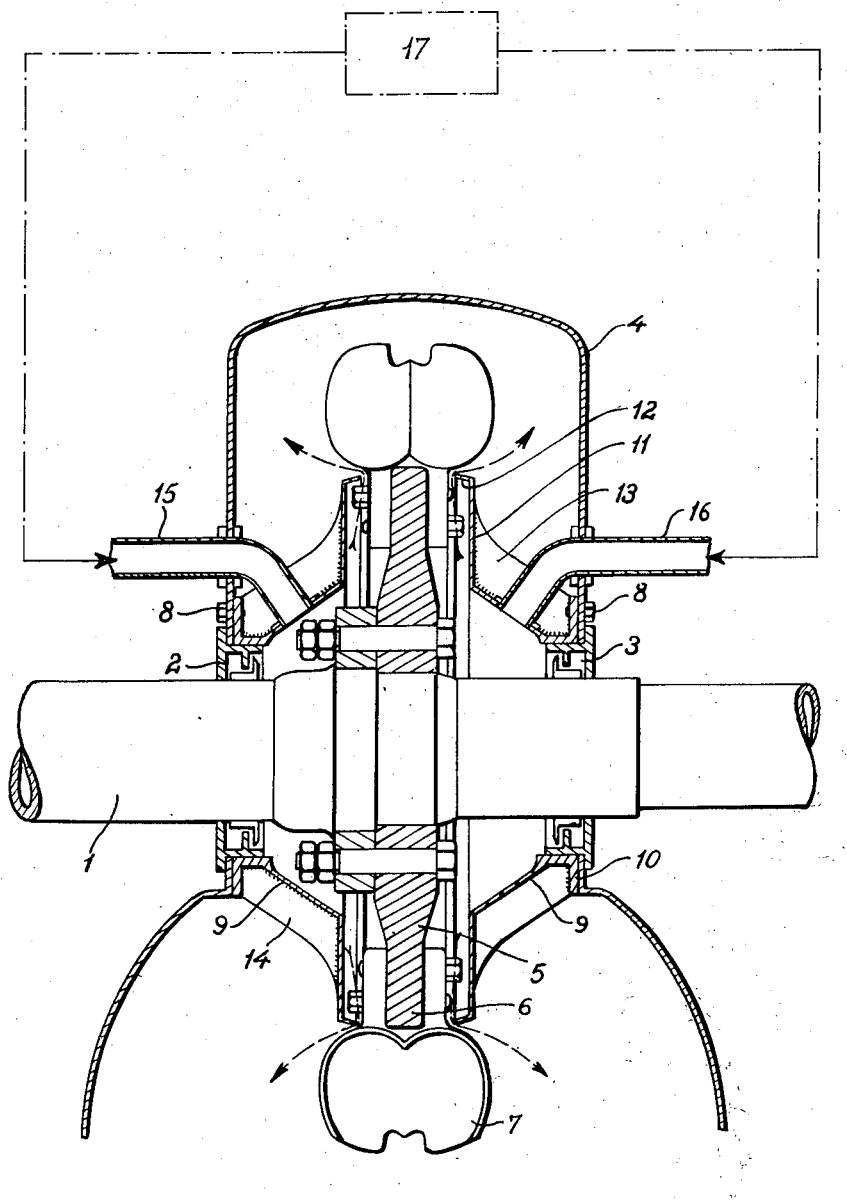

2,828,104

PARTIAL-INJECTION WATER TURBINES

Elie Fontaine, Lyon, France, assignor to Electricite de France (Service National), Paris, France, a French national service Application March 1, 1956, Serial No. 568,822

Claims priority, application France March 5, 1955

4 Claims. (Cl. 253—26)

The present invention relates to partial-injection water turbines, or Pelton turbines.

It is known that in the operation of this type of turbine, the efficiency is affected by losses resulting from the fact that, since the wheel rotates in a heterogeneous fluid composed of air and an emulsion of water, its driving buckets stir up this fluid and thereby dissipate a certain amount of energy.

In accordance with what can be determined by theory, these losses increase in value as the density of the heterogeneous mixture of air and water emulsion increases.

The present invention has for its object to avoid or to reduce this source of losses, by reducing the density of the fluid in which the buckets rotate.

The means proposed to this end consist essentially in driving out the emulsion which is produced in the vicinity of the wheel and replacing this emulsion by air (or by any other gas, as may be desired) which is injected under pressure. Experience has shown that in this way the quantity of emulsion of water contained in the mixture can be thus reduced to varying extents, up to practically its complete elimination.

In accordance with one form of embodiment, there is formed on both sides of the wheel a double annular space constituted by two members or half-shells having generally a frusto-conical shape and arranged in such manner as to leave a small clearance between their circular base and the rim of the wheel as the bases of the buckets, and this double space is connected to a source of air (or of any other gas as the case may be) having a pressure slightly higher than atmospheric pressure.

The slightly-compressed gas which is led into the two annular passages and passes out at the base of the buckets, thus replaces, at the level of the buckets, the heterogeneous fluid composed of air and water emulsion.

A form of embodiment of this kind, given by way of example only, will be described below with reference to the attached drawing the single figure of which is a partially diagrammatic view illustrating in diametral cross-section a Pelton turbine equipped in accordance with the invention.

According to the form of embodiment chosen and shown, the turbine comprises a wheel 5 mounted on a shaft 1 which rotates in the bearings 2, 3 of a casing 4, a series of driving buckets 7 being mounted in known manner on the rim 6 of the wheel 5.

On each lateral face of the casing 4, there are mounted, by means of bolts such as 8 for example, two members of half-shells 9 of generally frusto-conical shape, the smaller base 10 of which is fitted over the bearings 2—3, and the larger base 11 of which extends parallel to the wheel and terminates in a turned-over edge 12 which ends at a short distance from the rim 6 at the base of the buckets 7. The half-shells thus formed are stiffened by a suitable number of ribs 13, 14 and two air-intake pipes 15—16 are provided to open into the surface of the said half-shells, and are coupled to a source of compressed air diagrammatically indicated at 17.

The air passing into the turbine in the direction of the arrows in full lines and passing out of the annular space formed by the two half-shells, on each side of the rim at the base of the buckets, following the arrows in broken lines, drives out the emulsion which exists in the vicinity of the rim and the buckets and the losses by windage are then reduced in the ratio, on the one hand of the specific weight of the air at a pressure only slightly different from atmospheric pressure, and on the other hand of the mixture of air and water emulsion, this ratio being variable due to the fact that the emulsion is of a heterogeneous nature. An injection pressure at the wheel rim slightly greater than atmospheric pressure will however suffice to obtain in practice a very substantial reduction in the windage losses.

This overpressure may be obtained, if so desired, not only from an external source as has just been described, but also by an arrangement of the turbine wheel itself, the latter acting as a fan and drawing in the exterior air through the conduits such as 15 and 16.

What I claim is:

1. In a partial-injection hydraulic turbine of the Pelton wheel type, comprising: a rotatably-mounted wheel; a plurality of driving buckets associated with the rim of said wheel; and a fixed casing enclosing the said moving wheel assembly; means for continuously expelling from the zone of movement of said buckets into which the said buckets are about to move, the resistant emulsion of water and air formed in the said zone, the said means comprising: a source of gas under pressure, a pair of fixed dished members of substantially the same diameter as the rim of said wheel, the said members being mounted one on each side of said wheel with a small axial clearance adjacent the said rim so as to form two annular chambers, and conduit means for coupling the said source to both said annular chambers, whereby the efficiency of the said turbine is increased by reducing the resistive-fluid losses.

2. A hydraulic turbine as claimed in claim 1, in which the said dished members are of substantially frusto-conical shape.

3. A hydraulic turbine as claimed in claim 1 in which the pressure delivered by the said source of gas is slightly greater than atmospheric pressure.

4. A hydraulic turbine as claimed in claim 1 in which the gas delivered from said source under pressure is air.

References Cited in the file of this patent

UNITED STATES PATENTS

| | | |
|---|---|---|
| 1,823,624 | Nagler | Sept. 15, 1931 |
| 2,079,258 | Kerr | May 4, 1937 |
| 2,295,495 | Anderson | Sept. 8, 1942 |

FOREIGN PATENTS

| | | |
|---|---|---|
| 7,544 | Germany | Mar. 16, 1879 |
| 498,572 | Belgium | Feb. 1, 1951 |